United States Patent [19]
Osawa et al.

[11] Patent Number: 5,588,750
[45] Date of Patent: Dec. 31, 1996

[54] BALL RETAINER WITH INNER SEAL FOR LINEAR GUIDE APPARATUS

[75] Inventors: Nobuyuki Osawa; Masayuki Katahira, both of Gunma, Japan

[73] Assignee: NSK Ltd., Tokyo, Japan

[21] Appl. No.: 504,579

[22] Filed: Jul. 20, 1995

[30] Foreign Application Priority Data

Jul. 20, 1994 [JP] Japan .................. 6-168184

[51] Int. Cl.⁶ ................................. F16C 29/06
[52] U.S. Cl. ................................. 384/15; 384/45
[58] Field of Search .................. 384/15, 45, 43, 384/49

[56] References Cited

U.S. PATENT DOCUMENTS 4,918,846  4/1990  Tsukada ........................ 384/15
4,929,095  5/1990  Osawa .......................... 384/45

Primary Examiner—Thomas R. Hannon
Attorney, Agent, or Firm—Sughrue, Mion, Zinn, Macpeak & Seas

[57] ABSTRACT

In a linear guide apparatus including a guide rail, a slider hanging over the guide rail to freely move with respect to the guide rail through the rolling movements of balls and a ball retainer mounted within the slider for holding the balls, the ball retainer is formed of plate-shaped metal and includes two ball holding parts respectively formed by bending the two side edge portions of a thin metal plate and two thin-plate shaped inner seal parts extending along and fixed integrally to the ball holding parts with the end portions thereof slidingly contactable with the upper surface of the guide rail. The ball retainer has not only a ball retainer function to be able to hold a large number of balls loaded into the ball rolling grooves formed in the slider but also an inner seal function to prevent foreign matter which have passed through side seals into the slider from entering into the ball rolling grooves.

8 Claims, 5 Drawing Sheets

FIG. 8
PRIOR ART
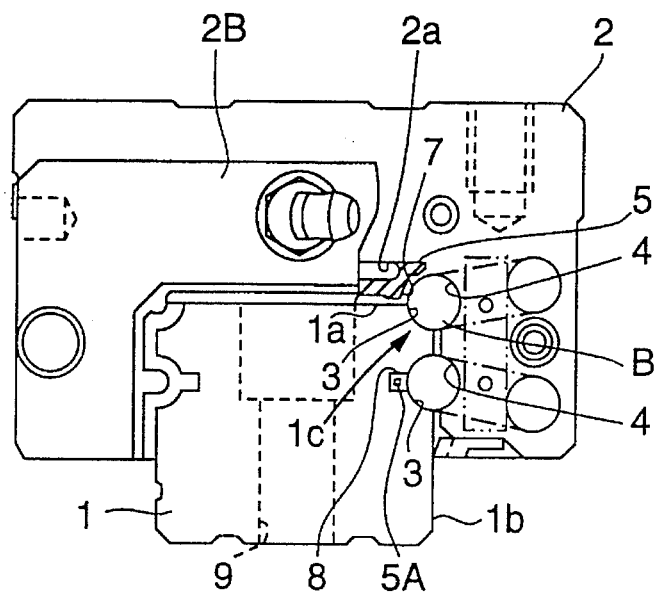
FDIG. 9
PRIOR ART
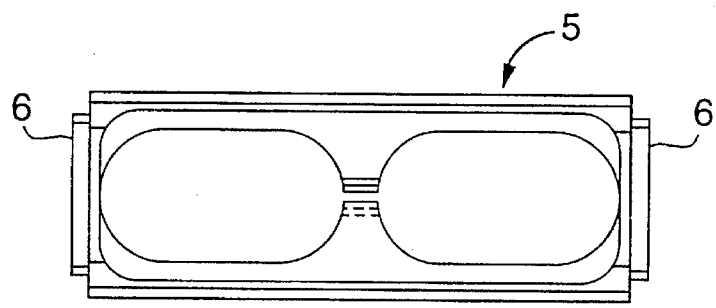
FIG. 10
PRIOR ART
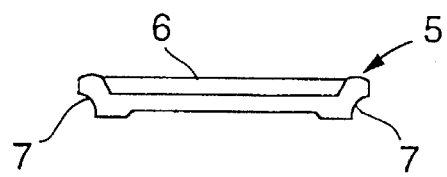

BALL RETAINER WITH INNER SEAL FOR LINEAR GUIDE APPARATUS

BACKGROUND OF THE INVENTION

The present invention relates to a ball retainer for a linear guide apparatus of a type that a slider hangs over a guide rail to freely move with respect to the guide rail through the rolling movements of balls. In particular, the present invention relates to an improved ball retainer which is mounted within the slider for holding the balls.

A conventional ball retainer of this type for a linear guide apparatus is disclosed in U.S. Pat. No. 4,929,095. As shown in FIG. 8, in a linear guide apparatus into mounting the ball retainer 5 therein, a guide rail 1 includes two ball rolling grooves 3 formed in a middle portion of a rail side surface 1b and an upper end portion (that is, a rail ridge portion 1c), respectively. In the linear guide apparatus, a large number of balls B are rollingly guided by the ball rolling groove 3 of the guide rail ridge portion 1c and a ball rolling groove 4 formed in the inner surface of a slider 2 opposed to the ball rolling groove 3. The ball retainer 5 holds the balls B so as to prevent them from falling away from the ball rolling groove 3 when the slider 2 is removed from the guide rail 1. And, the ball retainer 5 is disposed in a space within a recessed portion of the slider 2 hanging over the guide rail 1, particularly, the space being formed between an upper surface 1a of the guide rail 1 and an inner surface 2a of the slider 2 opposed to the guide rail upper surface 1a.

The ball retainer 5 has a planar shape which is similar to a substantially rectangular frame shape, as shown in FIG. 9. The ball retainer 5 includes two engaging portions 6 which are respectively formed in the longitudinal ends of the frame shape to project in the axial direction thereof. The ball retainer 5 also includes two ball hold grooves 7 which are respectively formed in both side edges of the frame shape and arc-shaped in cross section as shown in FIG. 10. In order to mount the ball retainer 5 into the slider 2, the engaging portions 6 are fitted into insertion recessed portions (not shown) formed in connecting end faces of two end caps 2B which are respectively connected to both ends of the slider 2.

On the other hand, in a wire shape is formed a ball retainer 5A for holding the balls B which exist within the ball rolling groove 4 below the slider 2 shown in FIG. 8. Further, the ball retainer 5A is such structured that, when the slider 2 is assembled to the guide rail 1, the ball retainer 5A can be received into a retainer escape groove 8 formed in the bottom surface of the ball rolling groove 3 formed in the side surface 1b of the guide rail 1. In FIG. 8, a hole 9 is formed in the guide rail 1 for a rail mounting bolt.

On the other hand, U.S. Pat. No. 4,918,846 has disclosed a dustproof seal in which a seal member contacting slidingly the upper surface of the guide rail is disposed in substantially the same portion as the above-mentioned ball retainer within the recessed portion in the slider and a seal (an inner seal) is disposed within the slider, so that the seal member prevents foreign matter from entering into the ball rolling groove of the slider. Such an inner seal is effective especially for a linear guide apparatus which is used in a dusty atmosphere. That is, dust is easy to collect in a cavity which is formed in the head portion of the guide rail mounting bolt to locate slightly lower than the rail surface. The dust collecting in the cavity passes through two side seals, which are generally mounted on the two end faces of the slider, and enters into the slider. If the dust collects only a little, then there arises no problem. However, if the amount of the collecting dust is large, then the entered dust attaches to the ball rolling grooves 3, 4 and balls B to thereby apply an obstacle to the operation of the linear guide apparatus.

The inner seal effectively seals between the rail upper surface and ball rolling grooves 3, 4 to prevent the dust from entering into them.

However, the conventional ball retainer 5 disclosed in the above-mentioned U.S. Pat. No. 4,929,095 is a single function device which is only able to hold the balls B within the upper ball rolling groove 4 in the slider 2. Therefore, there is a problem which it is not able to prevent the foreign matter from entering into the ball rolling grooves 3, 4.

On the other hand, the conventional inner seal disclosed in the above-mentioned U.S. Pat. No. 4,918,846 is also a single function seal which has only the sealing function but does not have the ball hold function. For this reason, especially when the inner seal is mounted in the slider of a linear guide apparatus of a type that the upper ball rolling grooves 3 of the guide rail 1 is formed in the rail ridge portion 1c as shown in FIG. 8, then there arises a problem which it is not possible to hold the balls within the upper ball rolling groove on the slider side corresponding to the ball rolling groove formed in the rail ridge portion.

SUMMARY OF THE INVENTION

The present invention aims at eliminating drawbacks found in a conventional ball retainer and an inner seal. Accordingly, an object of the invention is to provide an improved ball retainer with an inner seal at a low cost which has two functions of: a ball retainer function to be able to hold the balls existing within the ball rolling groove on the slider side corresponding to a ball rolling groove formed in the ridge portion of the guide rail; and an inner seal function to prevent the foreign matter, which has passed through the side seals into the slider, from entering into the ball rolling grooves.

In attaining the above object, according to the present invention, for a linear guide apparatus which provides a guide rail including in the side surface thereof axially extending ball rolling grooves, a slider including in the inner side surface thereof ball rolling grooves formed opposed to the ball rolling grooves of the guide rail, the slider being superposed on and across the guide rail such that it is movable in the axial direction with respect to the guide rail, and a large number of balls loaded into the mutually opposing ball rolling grooves, there is provided a ball retainer to be mounted within the slider, the ball retainer being disposed in a space formed within the slider and located above the guide rail, and the ball retainer including two ball holding parts respectively formed in the two side edges of the ball retainer by bending the two side edges of a metal plate for holding a large number of balls loaded into the ball rolling grooves of the slider, and two inner seal parts respectively extending along and fixed integrally to the ball holding parts and including end portions formed of thin plates to be in sliding contact with the upper surface of the guide rail.

Here, alternatively, the main body of the ball retainer can be formed of a substantially rectangular plate or a substantially rectangular frame which is hollowed expect for the peripheral portions thereof.

The ball retainer according to the present invention is capable of holding a large number of balls as well as acting as a dustproof seal within a slider. That is, when the slider is removed from the guide rail, the ball holding parts of the ball retainer are sure to hold the balls in the ball grooves formed in the slider. Also, when the slider, in which the ball retainer is mounted, is assembled to the guide rail, the inner seal parts of the ball retainer closely contact the upper surface of the guide rail to prevent the foreign matter such as cut powder, dust and the like attached to the guide rail upper surface from entering into the ball rolling portions.

To mount the ball retainer into the slider, the engaging portions of the ball retainer respectively formed in the two end portions thereof in the longitudinal direction can be fitted with the engaging portions of the slider respectively formed on the back surface of the end caps thereof, or may be screwed to the ceiling surface of a recessed portion formed in the slider.

The ball holding parts and inner seal parts of the ball retainer can be formed of metal and, in this case, they are excellent in heat resistance and thus they can be used at high temperatures.

On the other hand, the inner seal parts of the ball retainer can be formed of soft and elastic material such as synthetic resin or the like. In this case, they are inferior in heat resistance to the above inner seal parts formed of metal but are improved in sealing property over the metal inner seal parts.

Also, if the ball retainer is formed in a frame shape, then the weight thereof can be reduced.

BRIEF DESCRIPTION OF THE DRAWINGS

In the accompanying drawings:

FIG. 8 is a front view showing a linear guide apparatus mounting therein a conventional ball retainer, with part of the end caps being cut away;

FIG. 9 is a plan view showing a conventional ball retainer; and

FIG. 10 is a front view showing the conventional ball retainer shown in FIG. 9.

DETAILED DESCRIPTION OF THE PREFERRED EMBODIMENTS

Figure 1:
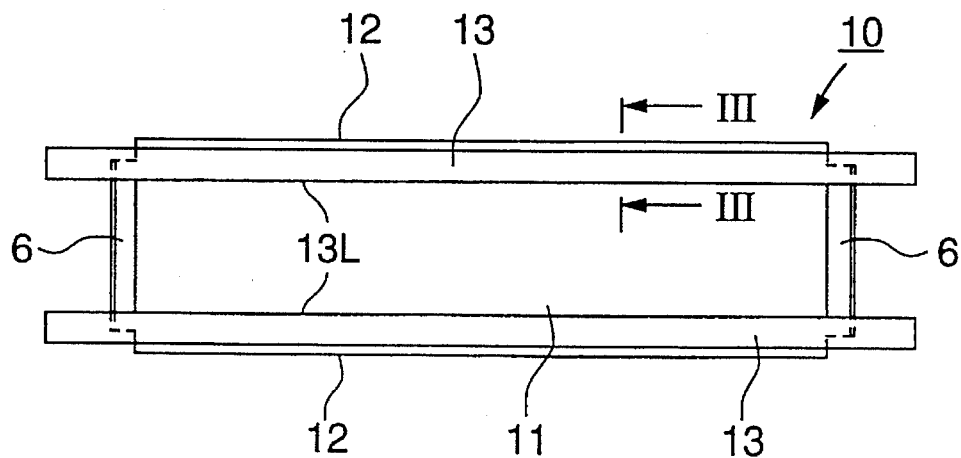
FIG. 1 is a bottom plan view showing an embodiment of a ball retainer according to the present invention.
Figure 2:
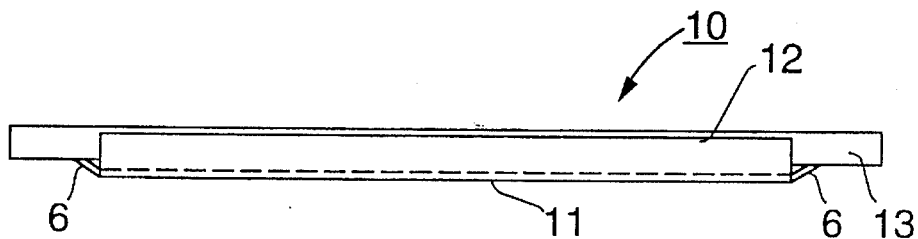
FIG. 2 is a side view showing the ball retainer shown in FIG. 1.
Figure 3:
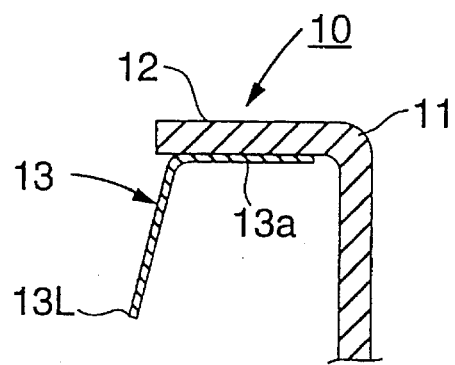
FIG. 3 is a section view taken along the line III—III shown in FIG. 1.
Figure 4:
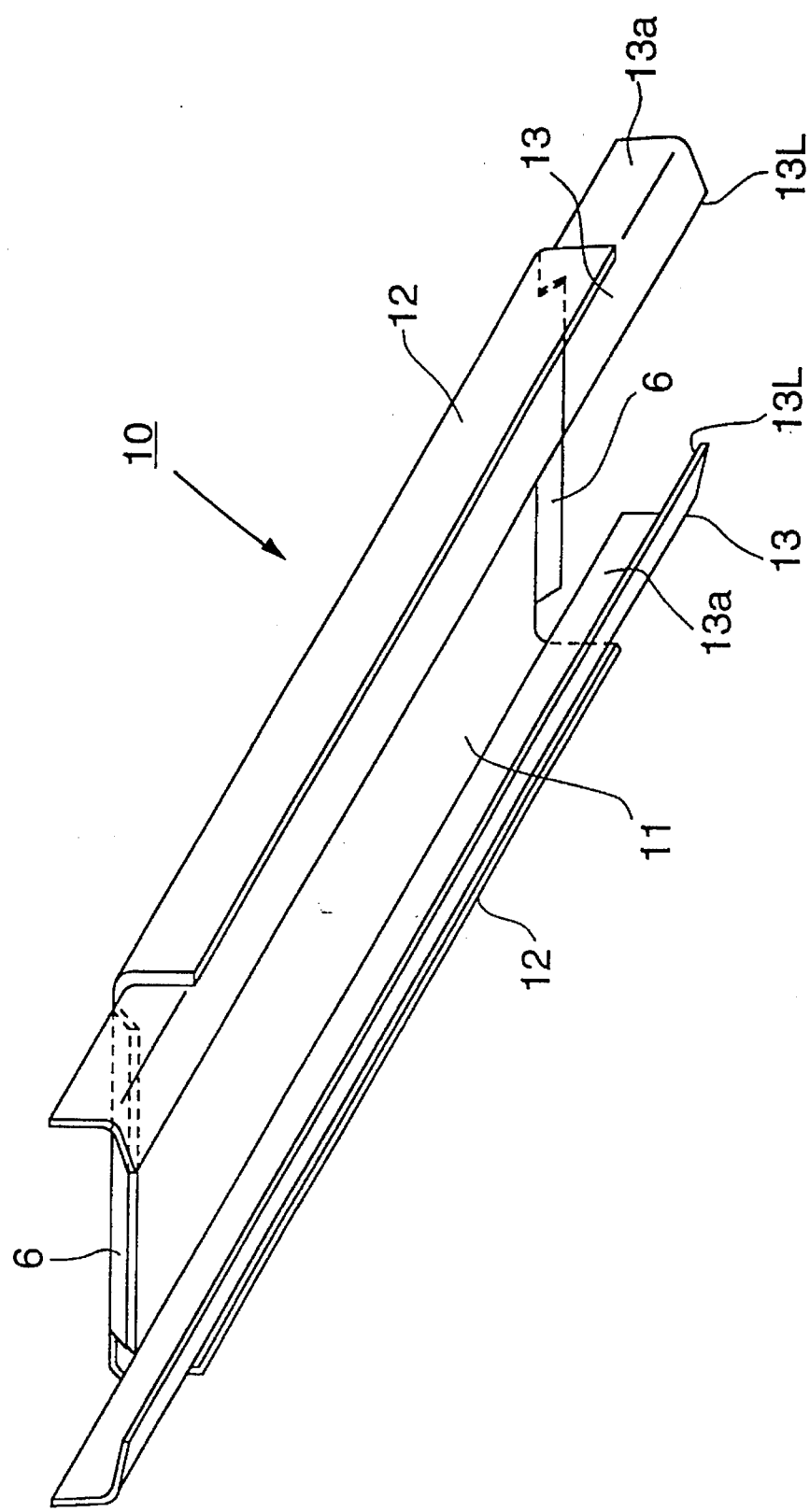
FIG. 4 is a perspective view showing the ball retainer shown in FIG. 1.
Figure 5A:
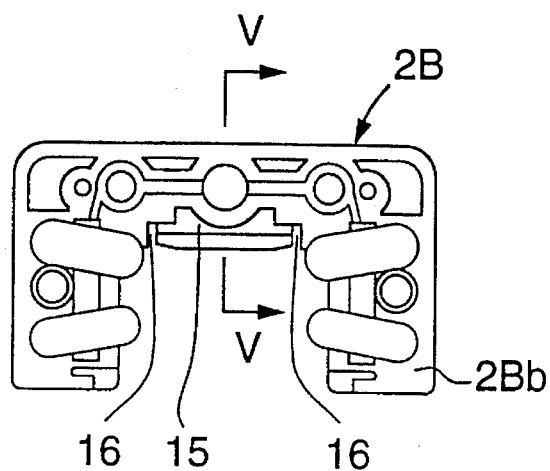
FIG. 5A is an explanatory back view showing an end cap structure for mounting the ball retainer.
Figure 5B:
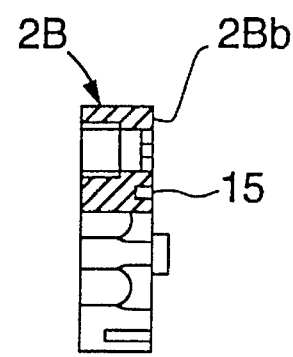
FIG. 5B is a section view taken along the line V—V shown in FIG. 5A.

Description will be give below of an embodiment of a ball retainer with an inner seal for a linear guide apparatus according to the present invention with reference to the accompanying drawings. In the embodiment, the same or equivalent parts to those used in the conventional ball retainer are given the same designations.

As shown in FIGS. 1 to 7, a ball retainer 10 includes a rectangular main body 11 formed of metal, two ball holding parts 12 respectively formed by bending and raising substantially at right angles the two side edge portions of the main body 11 in the width direction thereof, and two inner seal parts 13 respectively fixed integrally to the inner surfaces of the ball holding parts 12 and formed of a thin metal plate having a substantially L-shaped section.

The retainer main body 11 further includes in the two longitudinal ends thereof two engaging portions 6 which respectively project a relatively short distance in the axial direction of the main body 11 and are inclined slightly inwardly. As will be discussed later, the two engaging portions 6 are engageable with the back surfaces of end caps 2B.

Each of the inner seal parts 13 includes a substantially L-shaped side (that is, a raised side) serving as a mounting portion 13a to the retainer main body 11, that is, the mounting portion 13a is spot welded to the back surface of the ball holding part 12 so that the inner seal part 13 can be connected to the ball retainer 10. The L-shaped side of the inner seal part 13 includes a corner portion which is opened at an obtuse angle larger than right angles, while the end of the corner portion provides a seal lip 13L which is elastically contactable with the upper surface 1a of the guide rail 1 when the inner seal part 13 is mounted on the ball retainer 10. Also, the whole length of the inner seal part 13 is longer than that of the retainer main body 11, while the two end portions of the inner seal part 13 are extended or projected by an amount substantially equivalent to the thickness of the end cap 2B.

In order to mount the ball retainer 10 into the slider 2, in the back surface 2Bb of the end cap 2B, there is formed a retainer mounting groove 15 with which the engaging portion 6 of the ball retainer 10 is engageable. Further, in the two sides of the retainer mounting groove 15, there are formed slits 16, 16 for inner seals in such a manner that they extend through the thickness of the end cap 2B. The extended portions of the inner seal mounting portions 13a can be inserted into the inner seal slits 16, 16.

Figure 6:
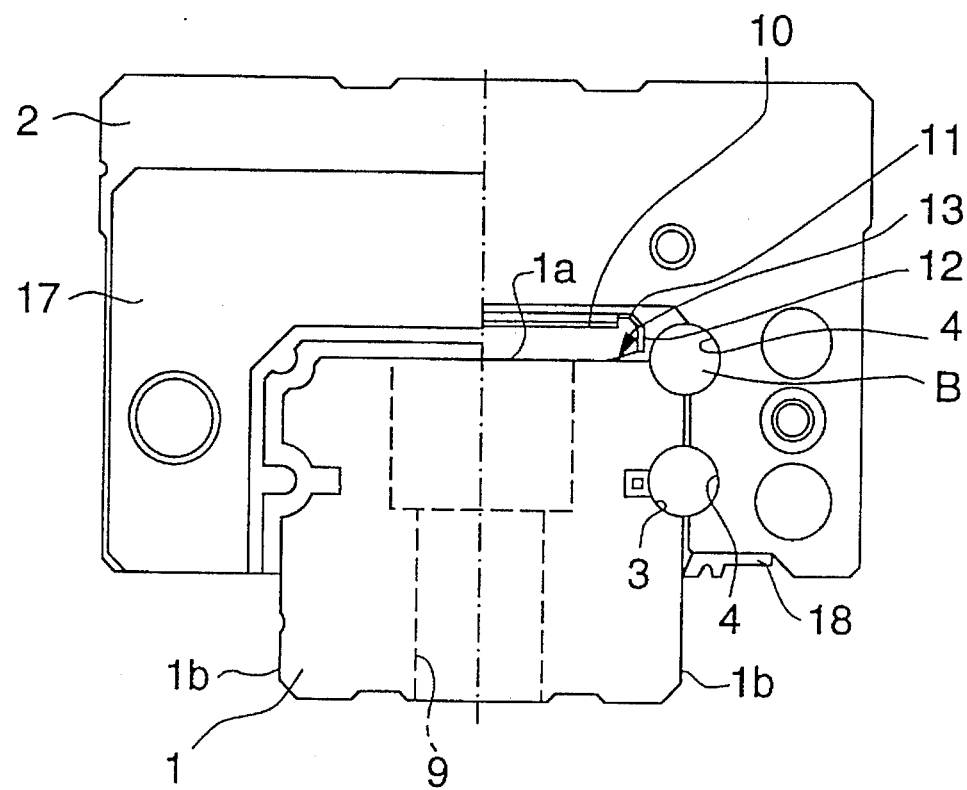
FIG. 6 is a front view showing a linear guide apparatus in which the ball retainer is mounted with part of the end caps being cut away.

In FIG. 6, a side seal 17 is mounted on the surface of the end cap 2B. An under seal 18 is mounted on the lower surface of the sleeve portion of the slider 2.

Next, description will be give below of the operation of the ball retainer 10.

Figure 7:
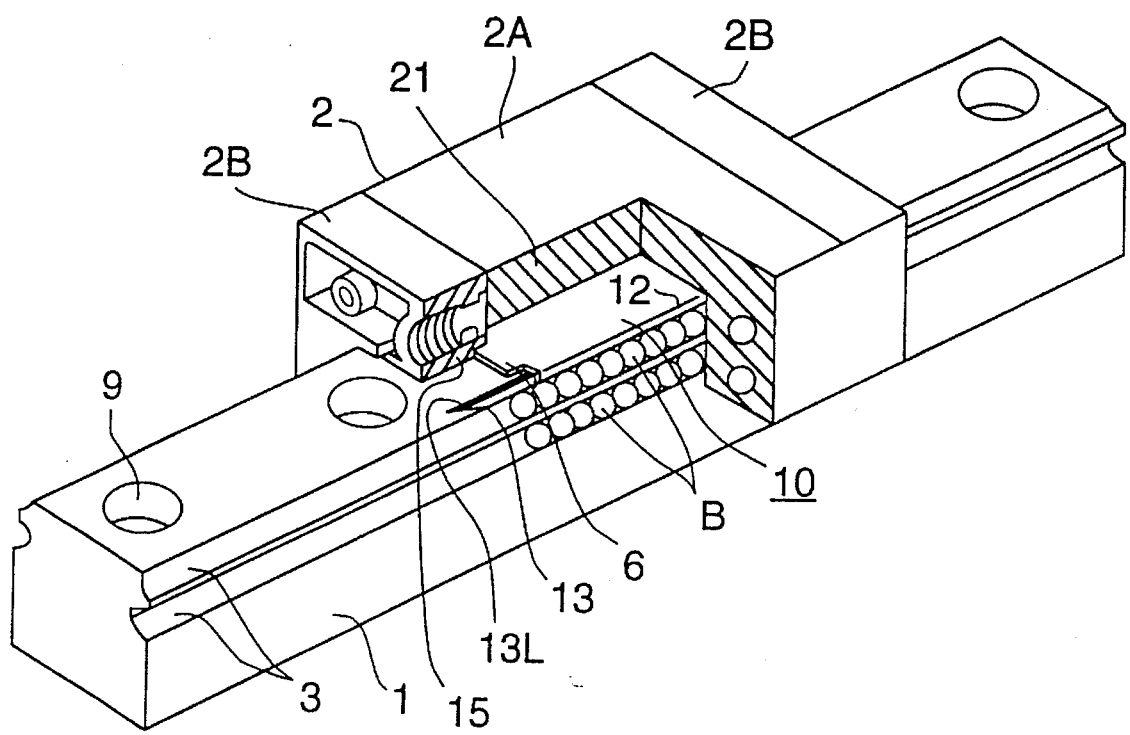
FIG. 7 is a partially cutaway perspective view showing the linear guide apparatus shown in FIG. 6.

As shown in FIG. 7, the ball retainer 10 can be mounted into the recessed portion formed in the slider 2 in such a manner that the engaging portions 6 formed in the end portions of the ball retainer 10 can be fitted into the retainer mounting grooves 15 formed in the back surface or the connecting end faces 2Bb of the end caps 2B respectively connected to the end portions of the main body 2A of the slider 2 by bolts. The inclined surfaces of the engaging portions 6 are respectively engaged with the retainer mounting grooves 15 and are pushed downward, and the seal lips 13L of the ball retainer 10 are elastically pressed and are thus contacted with the upper surface 1a of the guide rail 1.

Also, the extended portions of the mounting portions 13a of the inner seal parts 13 are respectively inserted into the inner seal slits 16, 16 respectively formed in the end cap 2B. Due to this, the extended portions of the seal lips 13L of the inner seal parts 13a are contacted with the portions of the guide rail upper surface 1a enclosed by the end caps 2B to thereby seal the same portions of the guide rail upper surface 1a.

After the ball retainer 10 is mounted in this manner, the balls B are loaded into the ball rolling grooves 4. Accordingly, since the balls B loaded into the ball rolling grooves 4 are supported by the ball holding parts 12 of the ball retainer 10 to be held accurately in the ball rolling grooves 4 of the slider 2, the balls B can be prevented from falling away from the grooves 4.

Then, the ball retainer 10 is mounted into the recessed portions of the slider 2, and the slider 2 with the balls B loaded therein is assembled to the guide rail 1. The seal lips 13L of the inner seal parts 13 of the ball retainer 10 prevent the foreign matter, which have passed through the side seals 17 into the upper surface 1a of the guide rail 1 existing in the interiors of the slider 2 or have collected in the cavities in the rail mounting bolt holes 9, from entering into the balls B and ball rolling grooves 3, 4. Due to this, lubricants for the balls B and ball rolling grooves 3, 4 can be always kept clean, which assures the long life of the linear guide apparatus.

Also, in the present embodiment, since the ball holding parts 12 and inner seal parts 13 of the ball retainer 10 are both formed of metal, the ball retainer 10 is excellent in heat resistance and thus can be used under the high temperature environment.

Further, since the inner seal parts 13 of the ball retainer 10 are axially extended and are thereby projected beyond the engaging portions 6, the ball retainer 10 can seal not only the whole length of the slider main body 2A but also the portions of the thicknesses of the end caps 2B respectively provided in the two ends of the slider main body 2A. Due to this, the ball retainer 10 can seal perfectly the whole slider 2 including the end caps 2B.

In the above-mentioned embodiment, the retainer main body 11 and the inner seal parts 13 of the ball retainer 10 are formed of metal. On the other hand, the retainer main body 11 can be formed of Synthetic resin by injection-molding. Further, the inner seal parts 13 can be formed of rubber or synthetic resin to be then fixed to the ball holding parts 12 by adhesives. Moreover, the retainer main body 11 can be formed of rubber or synthetic resin integrally with the inner seal parts 13. In this case, although the ball retainer of rubber or synthetic resin is inferior in heat resistance to the metal ball retainer 10, the sealing property thereof can be improved when compared with the ball retainer 10.

Also, although in the above-mentioned embodiment the retainer main body 11 is formed in a rectangular plate shape, alternatively, the central portion of the rectangular plate may be hollowed so that the rectangular plate can be turned into a frame shape. In this case, the frame-shaped retainer main body not only has similar ball holding function and sealing function to the above main body 11, but also is advantageously reduced in the weight thereof.

Further, with use of the centrally hollowed ball retainer, when a pressing device is disposed in a space between the guide rail upper surface and slider inner surface to reduce the vibration of the moving slider, or when the slider is fixed to the guide rail, the ball retainer provides no obstacle.

Moreover, in the above-mentioned embodiment, to mount the ball retainer into-the-slider 2, the engaging portions 6 provided in the two ends of the ball retainer in the longitudinal direction thereof are fitted with the retainer mounting grooves 15 formed in the back surfaces of the end caps 2B of the slider 2. However, this is not limitative but, alternatively, for example, there can be formed screw holes along the central line of the retainer main body 11 and then the ball retainer can be mounted onto the ceiling surface of the recessed portion by small screws inserted through the screw holes.

As described above, according to the present invention, the ball retainer includes two ball holding parts respectively disposed in the two side edges of the ball retainer and formed by bending a metal thin plate at the two side edges thereof for holding a large number of balls loaded into the ball rolling grooves formed in the slider, and two thin-plate-shaped inner seal parts respectively fixed to the ball holding parts with the end portions thereof slidingly contactable with the upper surface of the guide rail, while the ball retainer is disposed in a space formed within the slider and above the guide rail. Due to this, the ball retainer can not only fulfill a ball holding functional but also act as a dustproof seal. That is, according to one aspect of the ball retainer, when the slider is removed from the guide rail, the ball holding parts of the ball retainer are surely able to hold the balls in the ball rolling grooves of the slider. According to another aspect of the ball retainer, when the slider is assembled to the guide rail, the inner seal parts of the ball retainer come into close contact with the upper surface of the guide rail to thereby prevent the foreign matter from entering into the ball rolling portions and thus prevent the lubricants from being stained, which in turn can lengthen the life of the linear guide apparatus. Also, since the ball retainer is formed of plate-shaped metal, it can be mass-produced at low costs.

Due to the fact that the whole ball retainer is formed of plate-shaped metal, the ball retainer can be improved in heat resistance to provide a heat resisting ball retainer which can stand use under high temperature environments.

If the central portion of the retainer main body is hollowed to provide a frame-shaped main body, then the ball retainer can be further reduced in weight without lowering the ball holding and inner sealing properties thereof. Also, with use of the frame-shaped retainer main body, by providing a pressing device in a space between the slider inner surface and guide rail upper surface, the vibration of the slider can be reduced when it is moved, or the slider can be fixed to the guide rail.

If the inner seal parts of the ball retainer are formed of rubber or synthetic resin, then the sealing property of the ball retainer can be enhanced further due to use of the elasticity of such material, while the heat resistance of the ball retainer is lowered.

What is claimed is:

1. A linear guide apparatus comprising:

a guide rail including in a side surface thereof a first ball rolling groove extending in an axial direction of the guide rail;

a slider including in an inside surface thereof a second ball rolling groove formed in opposition to the first ball rolling groove, the slider hanging over the guide rail so that the slider is movable in the axial direction with respect to the guide rail;

a plurality of balls loaded into the mutually opposing ball rolling grooves; and a ball retainer being mounted into the slider and including an inner seal disposed in a space formed within the slider and the guide rail, wherein the inner seal has side edges comprising:

a pair of ball holding parts for holding the balls loaded into the second ball rolling groove to thereby prevent the balls from falling away from the second ball rolling groove when the slider is removed from the guide rail; and a pair of thin-plate shaped inner seal parts respectively extending along and fixed integrally to the ball holding parts, the inner seal parts including end portions slidingly contactable with an upper surface of the guide rail.

2. The linear guide apparatus of claim 1, wherein the ball retainer comprises a pair of engaging portions in longitudinal ends of the ball retainer, the engaging portions projecting slightly in the axial direction and inclining slightly toward the guide rail.

3. The linear guide apparatus of claim 2, wherein the inner seal parts axially project beyond the respective engaging portions.

4. The linear guide apparatus of claim 1, wherein the ball holding parts are formed by bending a thin-shaped metal plate in side edge portions thereof.

5. The linear guide apparatus of claim 1, wherein the ball holding parts are formed by injection-molding synthetic resin in a thin-shaped plate.

6. The linear guide apparatus of claim 1, wherein the inner seal parts are formed of rubber or synthetic resin.

7. The linear guide apparatus of claim 1, wherein the inner seal parts are formed of metal.

8. The linear guide apparatus of claim 1, wherein the ball retainer comprises a frame shape with a hollowed central portion.

* * * * *